Nov. 5, 1935. M. E. WIDELL 2,019,517
CAN TESTER
Filed April 26, 1928 12 Sheets-Sheet 1
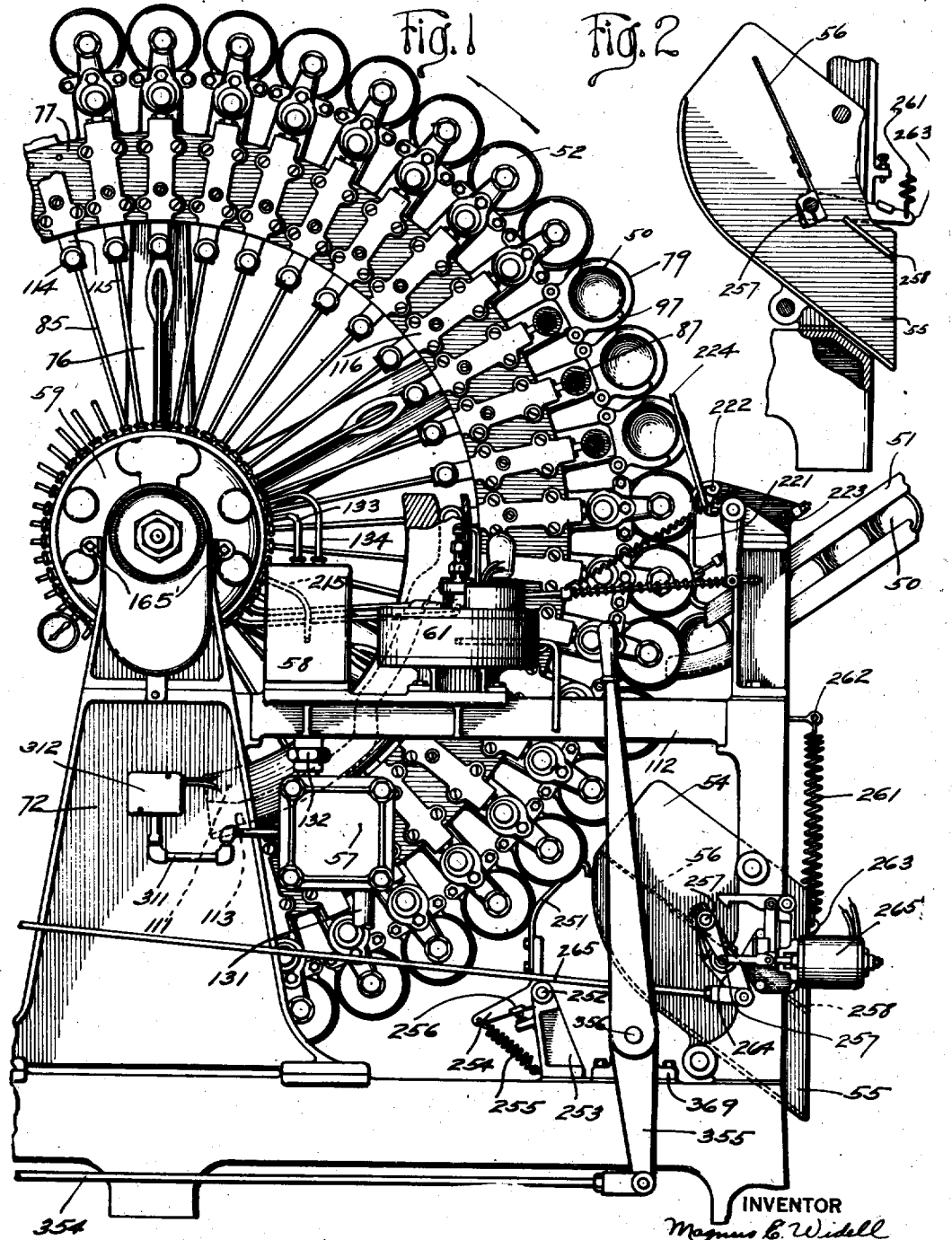
INVENTOR
Magnus E. Widell
BY John C. Carpenter
ATTORNEY

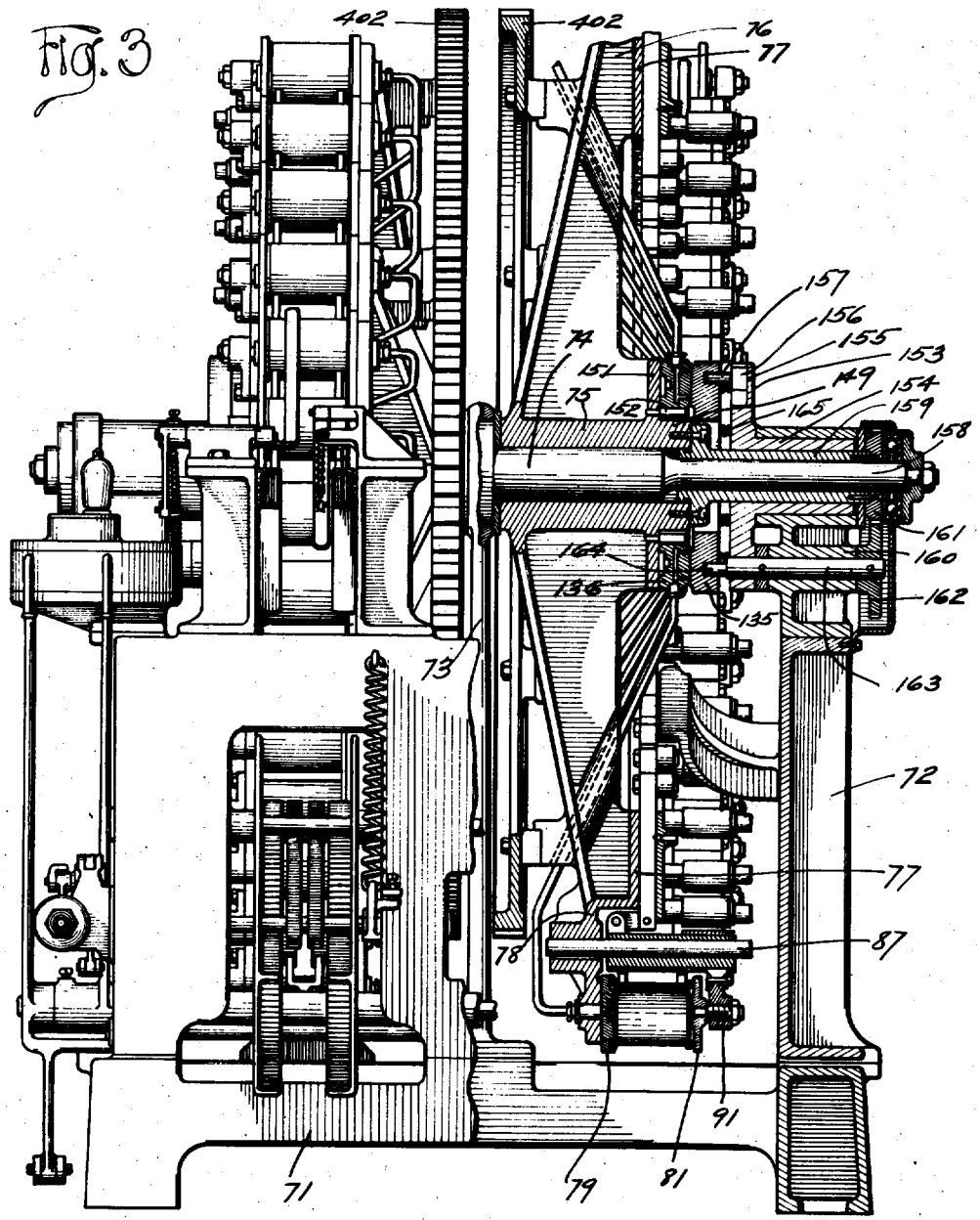

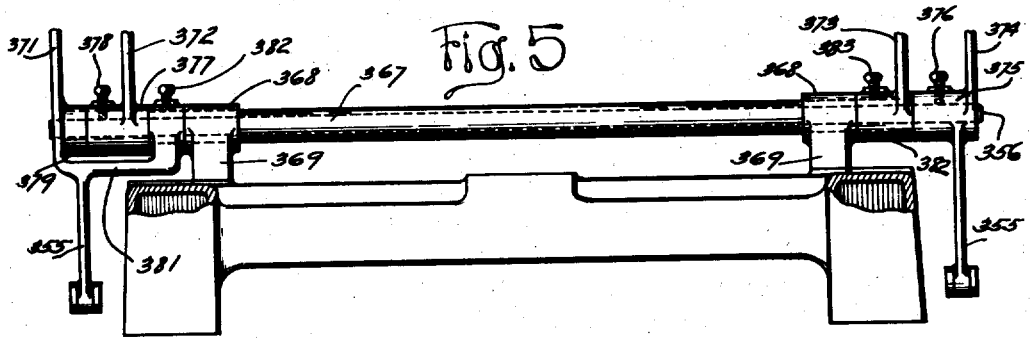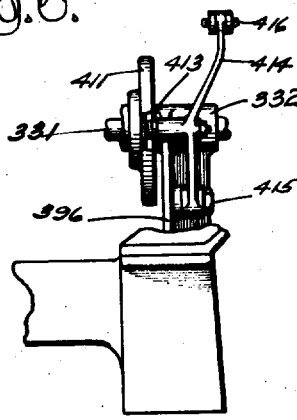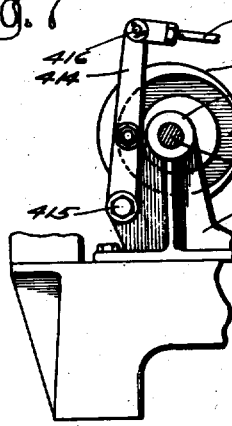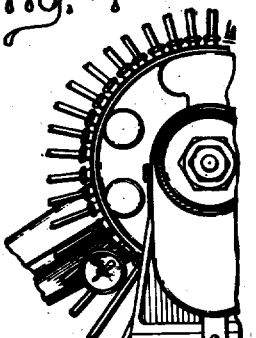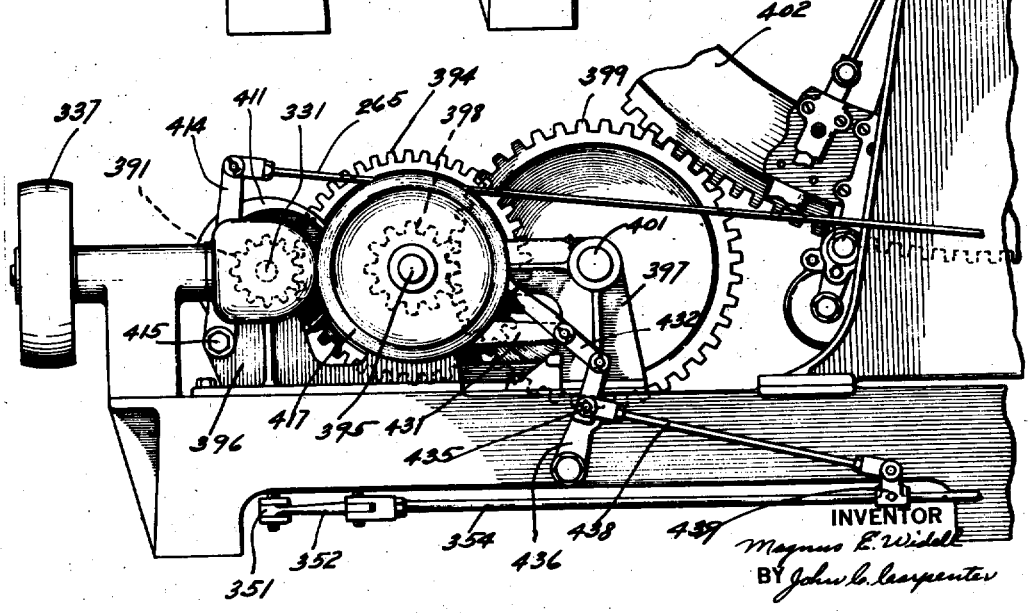

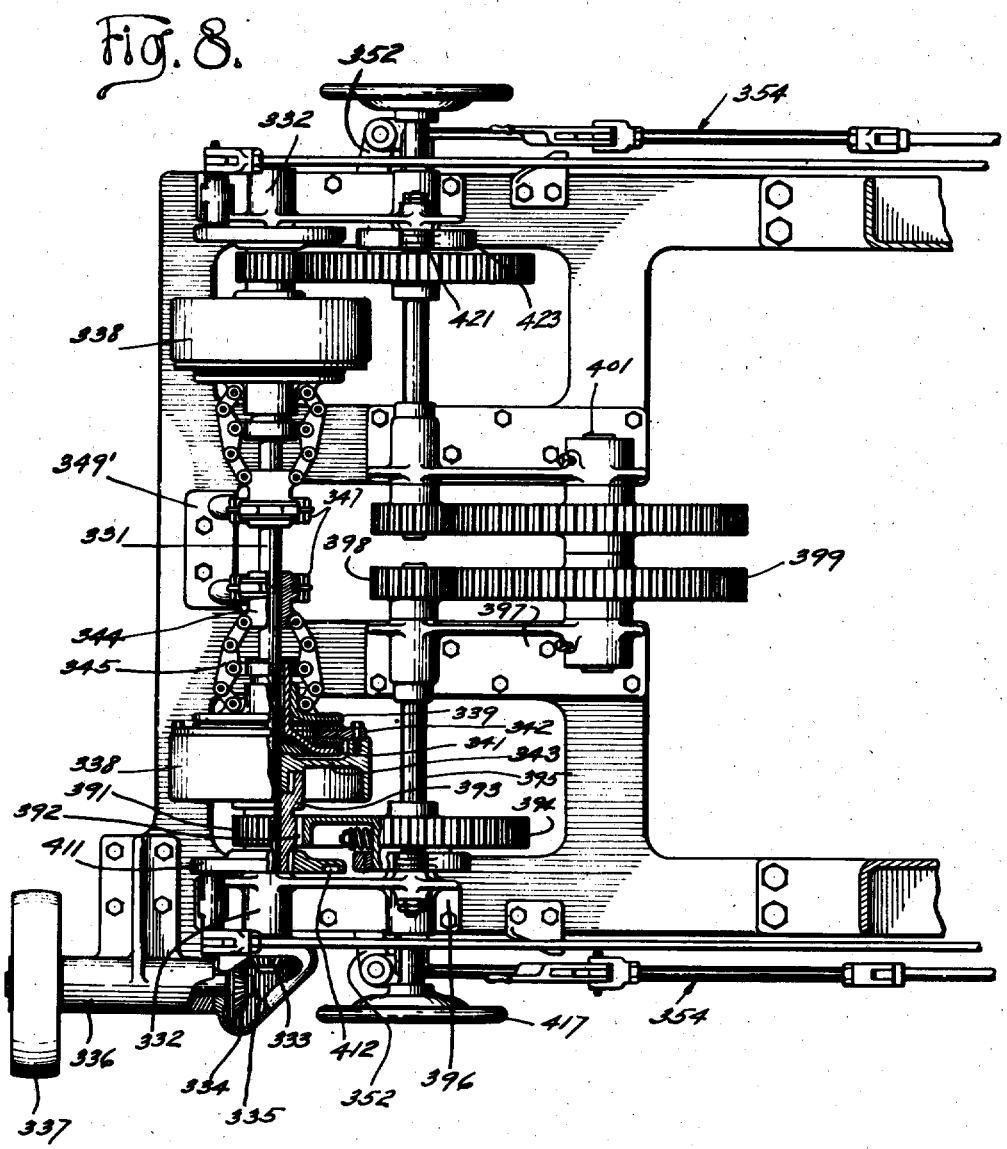

Nov. 5, 1935.     M. E. WIDELL     2,019,517
CAN TESTER
Filed April 26, 1928    12 Sheets-Sheet 5
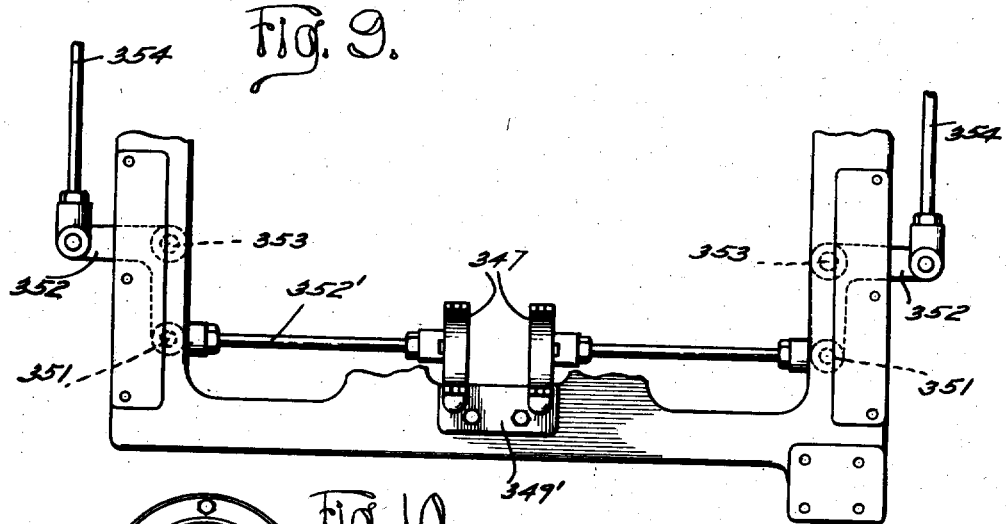
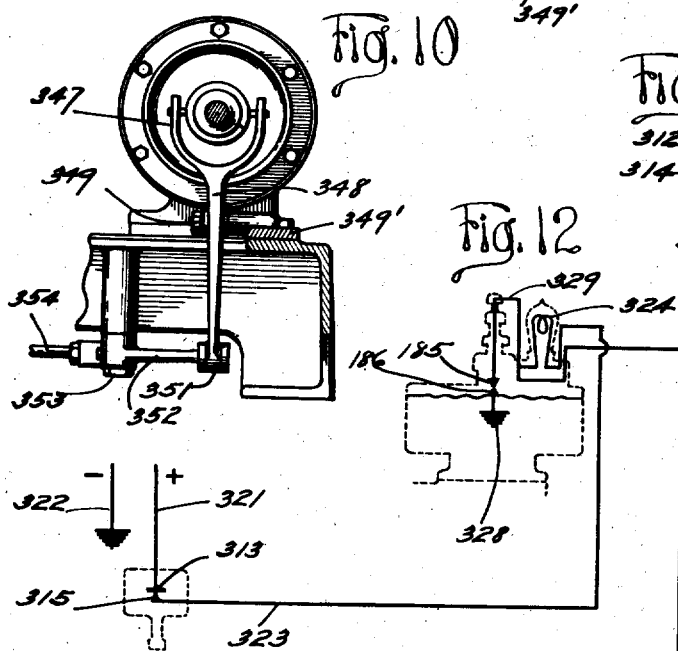
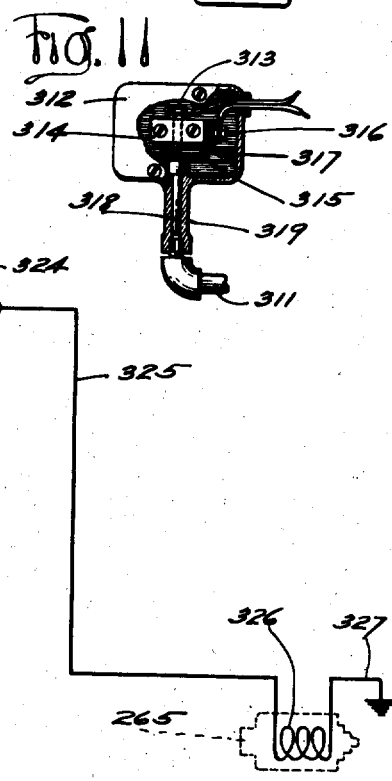
INVENTOR
Magnus E. Widell
BY John C. Carpenter
ATTORNEY

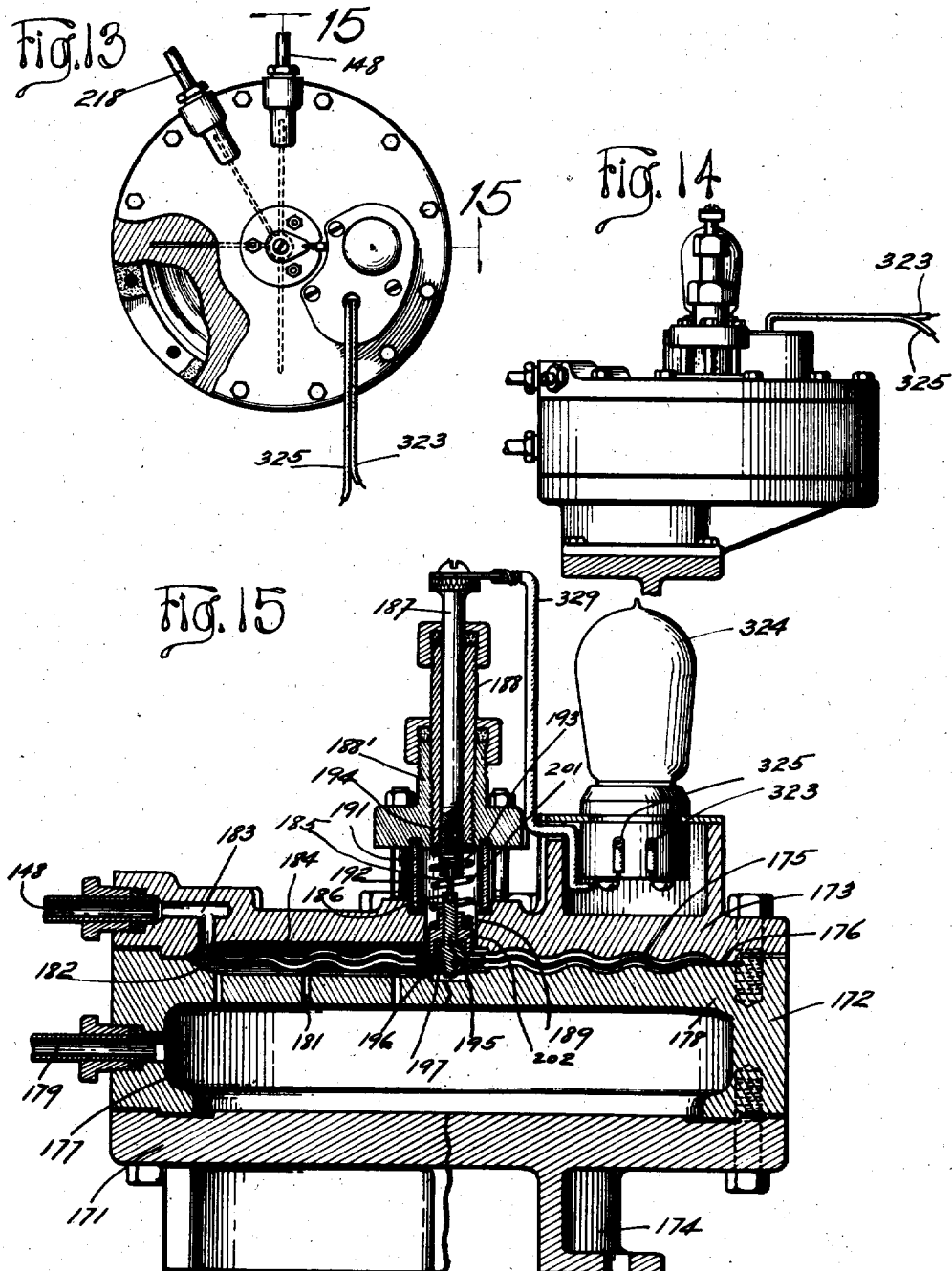

Nov. 5, 1935.   M. E. WIDELL   2,019,517
CAN TESTER
Filed April 26, 1928    12 Sheets-Sheet 7
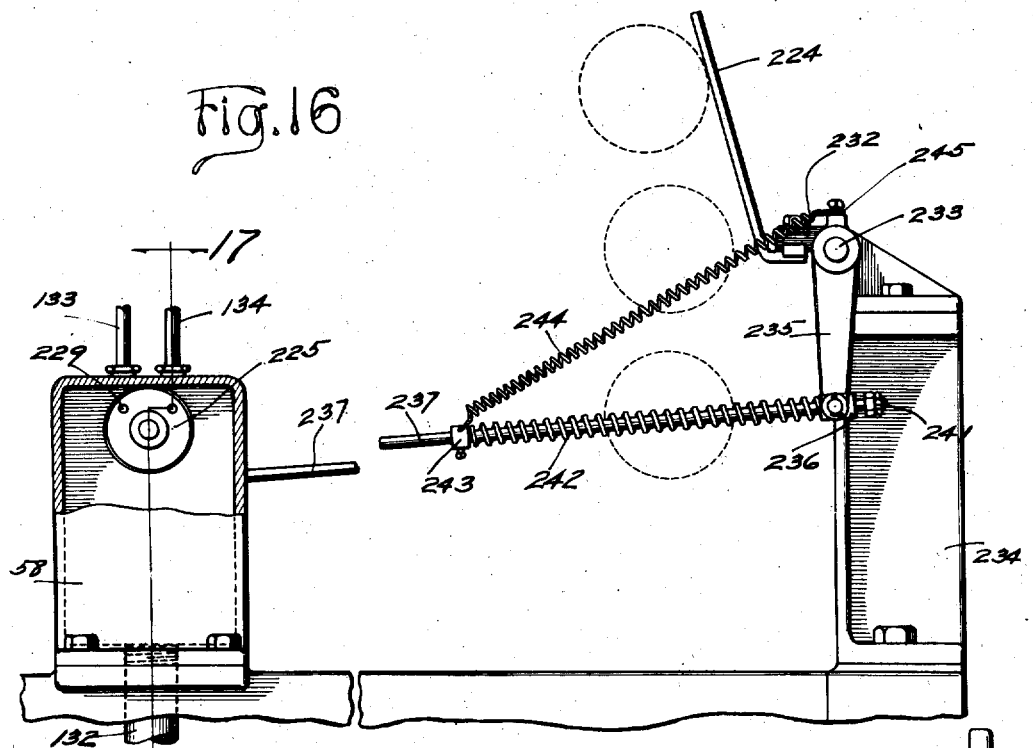
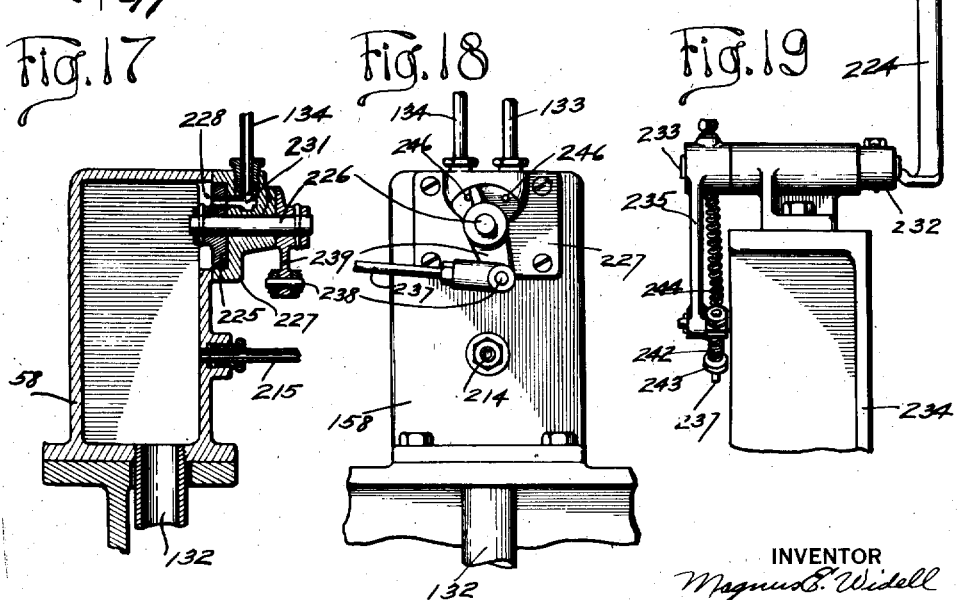
INVENTOR
Magnus E. Widell
BY John C. Carpenter
ATTORNEY

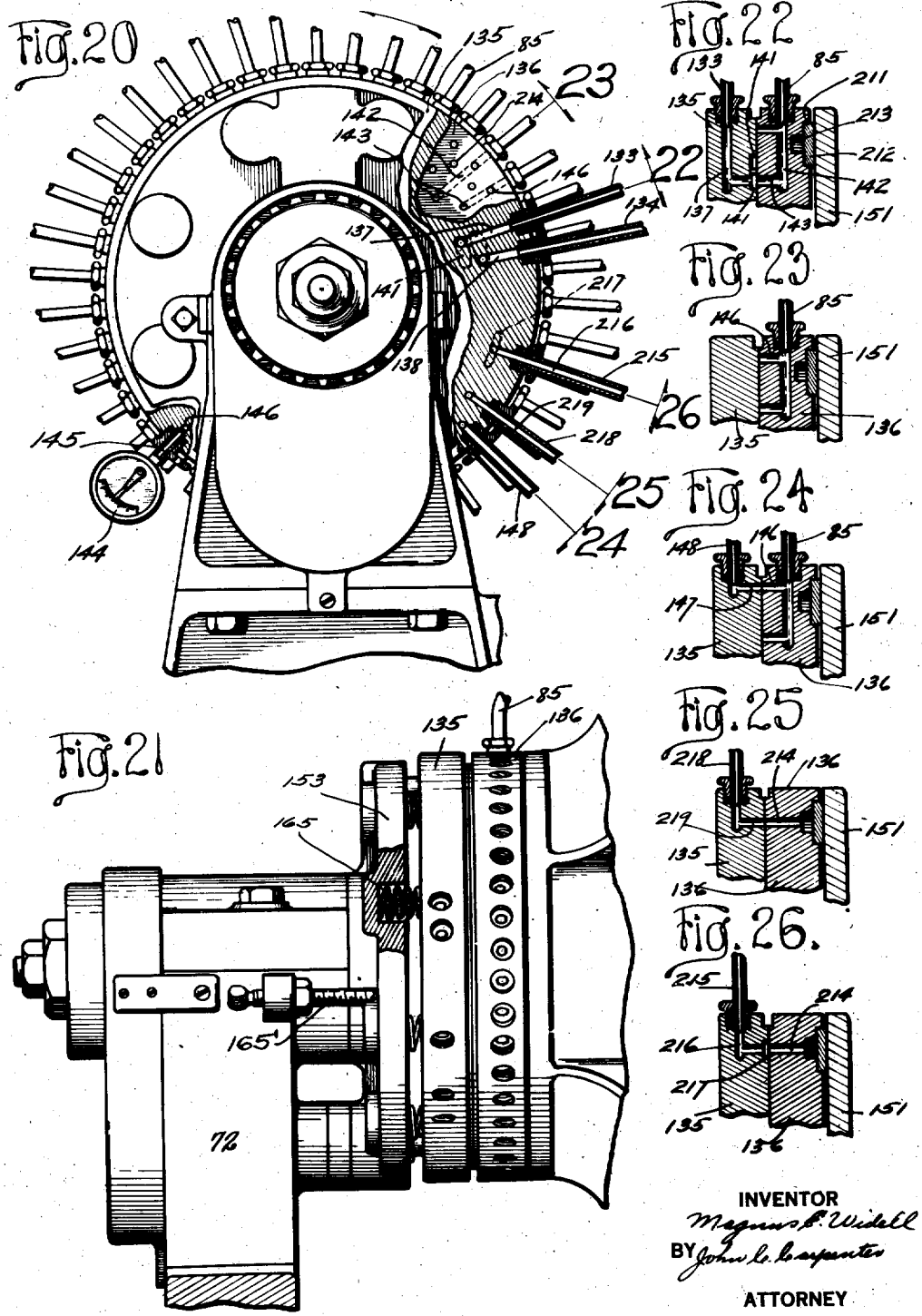

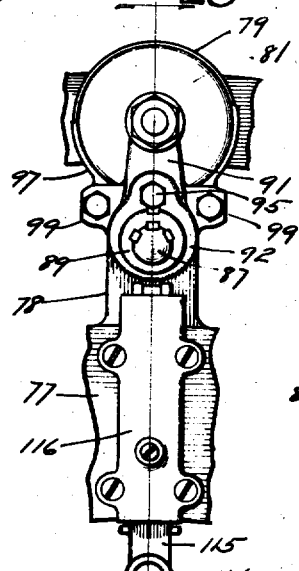
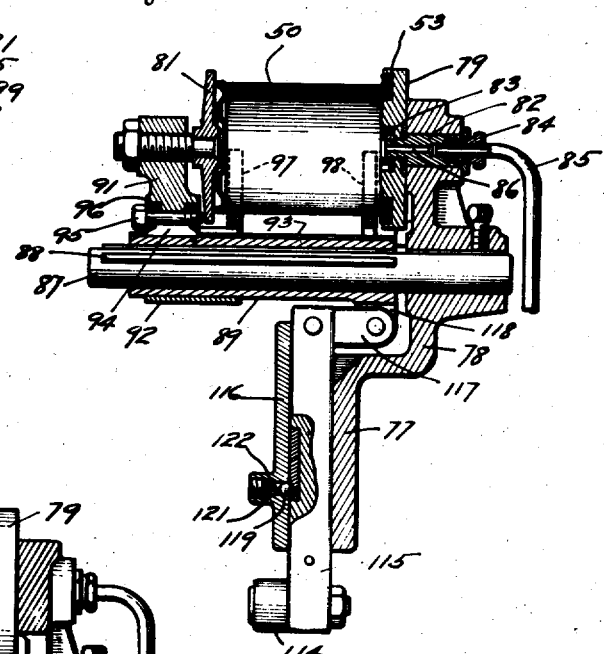
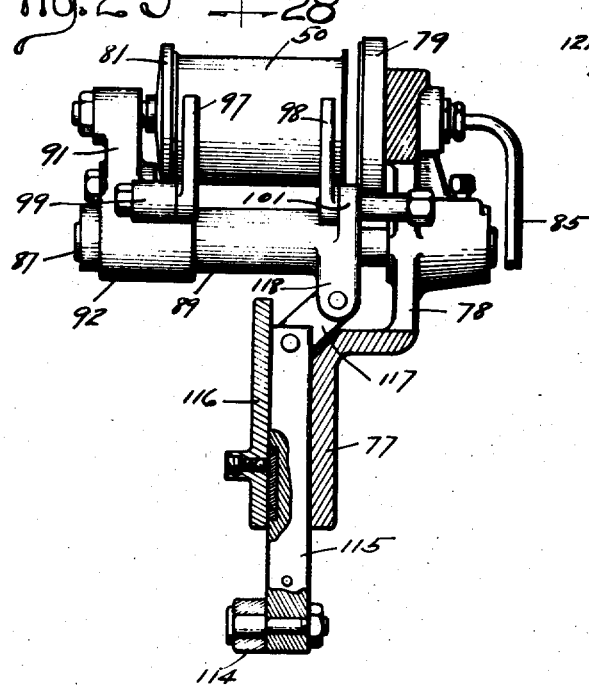

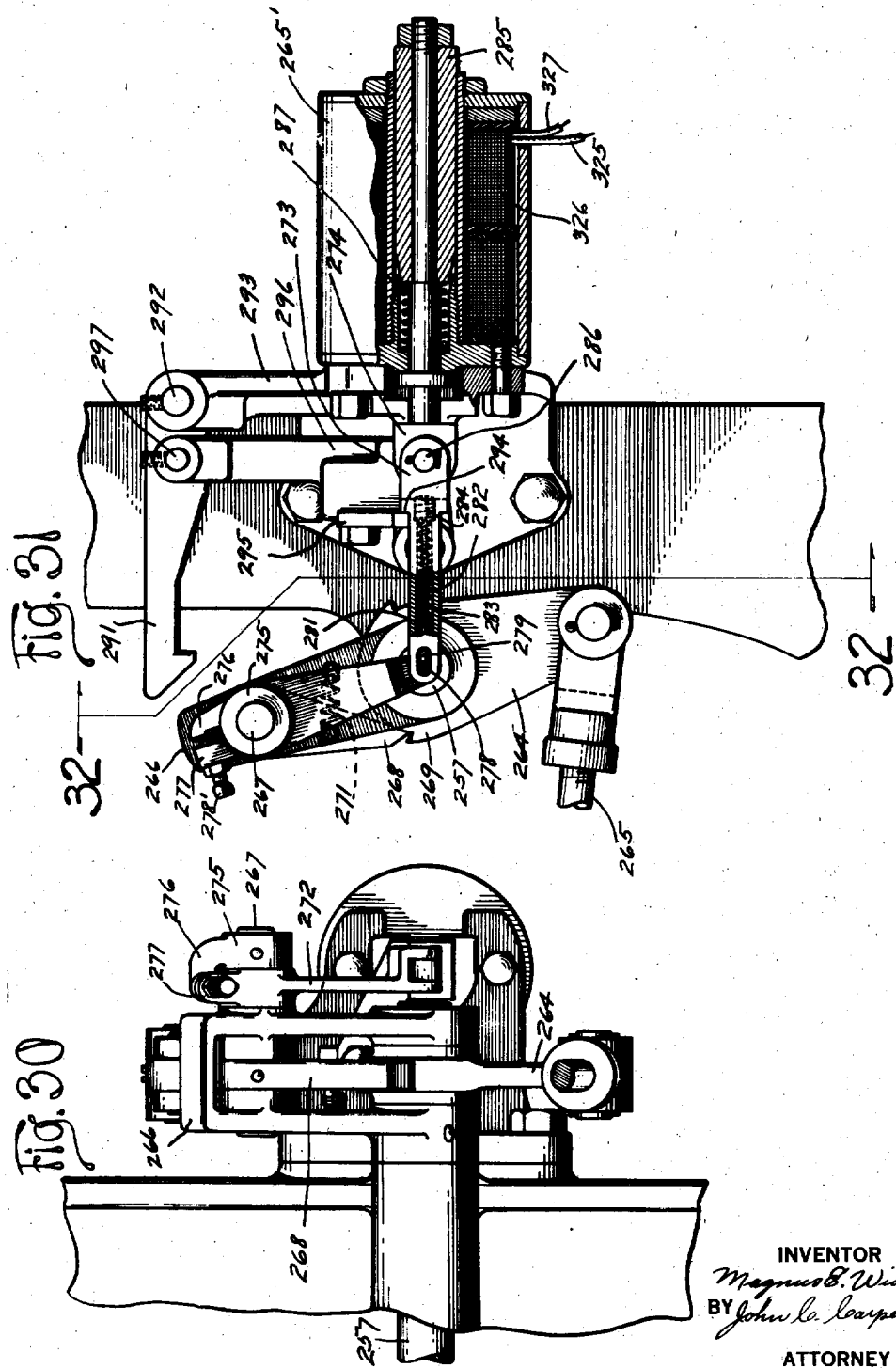

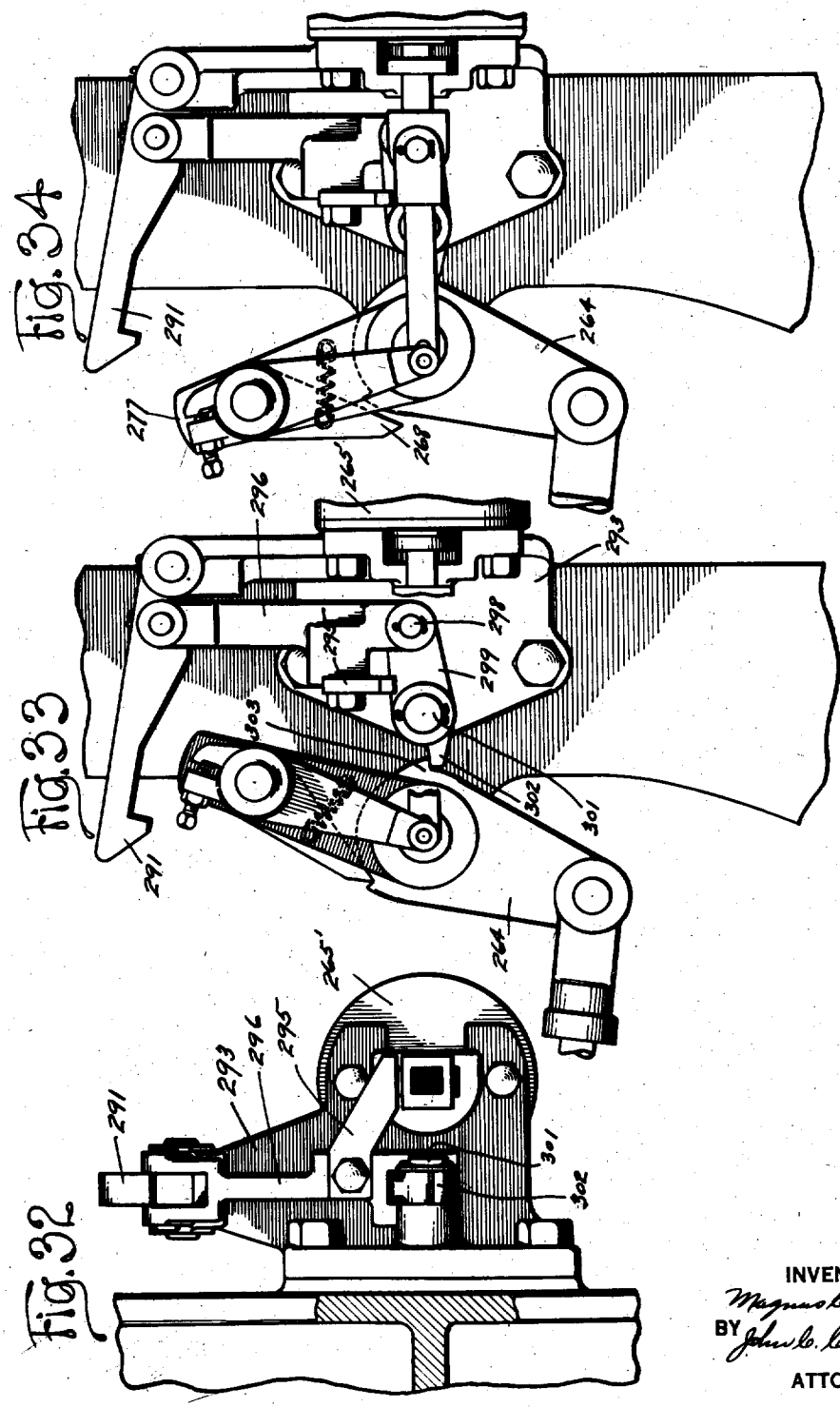

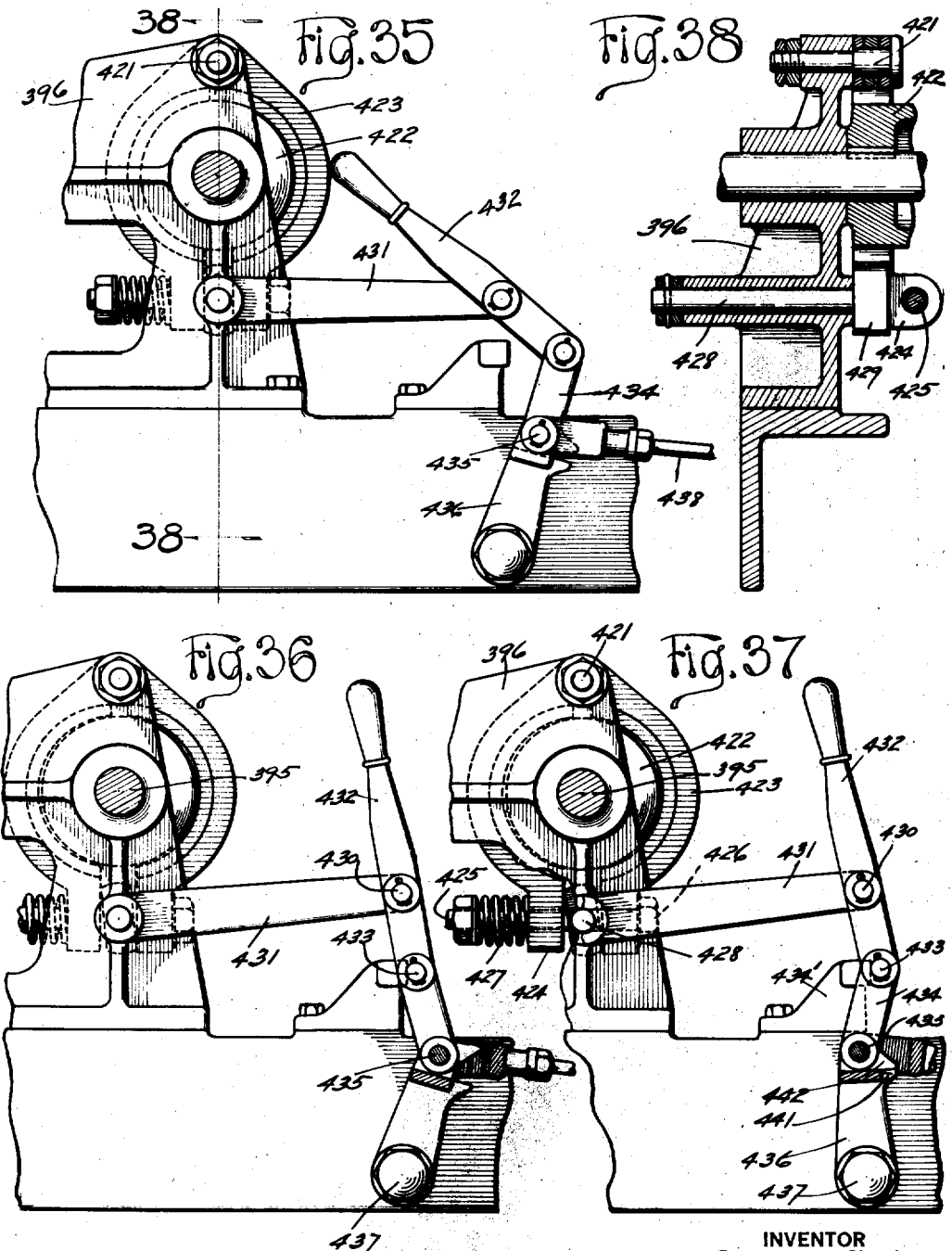

Patented Nov. 5, 1935

2,019,517

UNITED STATES PATENT OFFICE 2,019,517

CAN TESTER

Magnus E. Widell, Cincinnati, Ohio, assignor to American Can Company, New York, N. Y., a corporation of New Jersey Application April 26, 1928, Serial No. 272,889

9 Claims. (Cl. 73—51)

This invention relates to can testers of the wheel type and has for its objects generally stated improvement in the construction and operation and the provision in such an apparatus of various cooperating refinements incorporated to insure accuracy, increased capacity and easier control by the operator. The invention includes also numerous new devices.

One of the principal objects of the invention is the provision of a tester of this type having increased capacity. In accomplishing this two large testing wheels are provided and these are driven from a single source of power, their action being independent and subject to control from either side of the organized apparatus.

Another important object of the invention is the provision of means for insuring that the pressure of the air supplied to the can for testing shall be maintained to the desired degree, together with means for insuring against operation of the tester in sorting perfect from imperfect cans when the pressure of the air fails or drops below the predetermined desired amount.

Another important object of the invention is the provision for preventing air under pressure being delivered to a can pocket if no can has been received in the pocket before it has arrived at the air receiving station.

Another important object of the invention is the improvement of the entire air system to insure accurate and certain delivery of air to the cans and accurate and certain control of the sorting devices in accordance with the perfection and imperfection of the can seams.

Another important object of the invention is the provision of an improved control for the separating devices sorting the good from the bad cans, both in construction and operation of the parts, and also by the elimination of unnecessary mechanical movement thereof.

Numerous other objects and advantages of the invention will be apparent as it is better understood from the following description, which, taken in connection with the accompanying drawings, discloses a preferred embodiment thereof.

Referring to the drawings,

Figure 1 is a partial side elevation of an apparatus embodying the present invention, parts being broken away to disclose certain internal features of construction;

Fig. 2 is a detail vertical sectional view of a part of the gate control;

Fig. 3 is an end view, parts being broken away and shown in section at one side of the apparatus, the sectional portion being taken vertically through the axis of one of the can testing wheels;

Fig. 4 is a partial side elevation of the apparatus embodying the present invention, which taken in conjunction with Fig. 1 discloses substantially an elevation of the entire apparatus;

Fig. 5 is a partial end view looking from the right in Fig. 1 of the control mechanism;

Fig. 6 is an end view of the gate control cam and cam lever;

Fig. 7 is a fragmentary elevation of the same;

Fig. 8 is a top plan view of the power transmission for imparting rotation to the can carrying wheel;

Fig. 9 is a fragmentary plan view of the clutch operating mechanism;

Fig. 10 is a detail elevation of the same;

Fig. 11 is an elevation partly in section of the no-air-no-current switch;

Fig. 12 is a wiring diagram of the electrical circuits, included in the apparatus;

Fig. 13 is a top plan view, parts being broken away, of the detector valve;

Fig. 14 is a side elevation thereof;

Fig. 15 is an enlarged section taken substantially on the line 15—15 of Fig. 13;

Fig. 16 is an enlarged elevation, partly in section, of the air valve box and the no-can-no-air mechanism;

Fig. 17 is a section taken substantially on the line 17—17 of Fig. 16;

Fig. 18 is a side elevation of the valve box;

Fig. 19 is an end elevation of the no-can-no-air control shown in Fig. 16;

Fig. 20 is an enlarged detail of the air distributor, parts being broken away and shown in section to disclose the air ports and passages;

Fig. 21 is a side elevation of the parts shown in Fig. 20, partly broken away;

Figs. 22, 23, 24, 25 and 26 are detail sections of the distributor showing the arrangement of the ports and passages at various stages in the cycle of the can testing operation. These sections are taken respectively on the lines indicated by reference characters 22, 23, 24, 25 and 26;

Fig. 27 is an end elevation of one of the can testing pockets and associated mechanism;

Fig. 28 is a section taken substantially on the line 28—28 of Fig. 27;

Fig. 29 is a side elevation of the same, parts being shown in section;

Fig. 30 is an end elevation of a can separator gate control;

Fig. 31 is a side elevation of the mechanism disclosed in Fig. 30, parts being shown in section to disclose certain features of construction;

Fig. 32 is a section taken substantially on the line 32—32 of Fig. 31;

Figs. 33 and 34 are views similar to Fig. 31, showing the parts in different arrangements;

Figs. 35, 36 and 37 are side elevations of the brake and clutch auxiliary release mechanism, showing the parts in different relative position; and Fig. 38 is a section taken substantially on the line 38—38 of Fig. 35.

General operation

Before entering upon a detailed description of the parts of the apparatus on the drawings and their arrangements, a brief description of the operation and function of the apparatus will be set forth:

Two tester wheels are mounted side by side and are driven from a common source of power. Can delivery and receiving mechanisms are associated with each wheel. From several viewpoints each wheel and these mechanisms may be considered a single organization duplicated to provide the two, and from other viewpoints, for example, power delivery and control of operation, the whole structure constitutes a single unit. So far as possible (for the sake of brevity) only one wheel and the devices individualized to it will be described in detail, it being understood that two such organizations are provided and that the description, both of mechanism and operation, applies to each.

Referring first to Figure 1, the cans are delivered from the can making machine down a chute 51. These cans indicated by reference 50 are open at one end. Can pockets generally indicated by reference character 52 are mounted upon the periphery of large continuously rotating tester wheels. The can pockets clamp the cans as indicated in Figure 28, the open end being pressed against an air-confining cushion 53. As the wheel rotates the cans are carried in the pockets around their circular path of travel to beneath the chute 51, where they are automatically delivered to two receiving chutes indicated in Fig. 1 by reference characters 54 and 55. The cans are sorted to separate the cans that leak from those that have perfect seams by a gate 56, which is moved in accordance with the condition of the can as determined by the tester to discharge the can into its proper receiving chute.

Air under pressure is supplied to the apparatus for testing the cans through a filter box 57 (Fig. 1) and from there to a valve box 58 controlled in accordance with the presence or the absence of cans in the pocket. The air passes from the valve box 58 to an air distributor 59 from whence it is supplied to each clamped can as it arrives at the air receiving station.

Communication between the interior of the can and the source of air under pressure is merely momentary and the can after leaving the air receiving station is sealed except against leakage through same. In this condition it passes about the path of travel until it arrives at or near to the delivery chutes 54 and 55. Here its air condition is determined by a detector valve 61 containing a diaphragm which moves upon disturbance from a predetermined balanced condition by reason of leakage earlier occurring in the can. Movement of this diaphragm through devices to be later described actuates the control for the gate 56.

Construction and mounting of the can tester wheel

Referring more particularly to Figs. 1 and 3, it will be noted that two tester wheels are provided in the apparatus. The frame of the machine comprises a bed 71 and a bearing post 72 extends up from each side of this base. A center bearing support 73 is arranged to extend up from the base, and a stationary cross-shaft 74 extends across the tops of the four posts or supports 72 and 73. The two tester wheels are mounted upon this shaft for independent rotation. Each of these wheels comprises a hub 75 from which spokes 76 extend out to a rim 77. This rim is provided with arms 78 (Figs. 28 and 29) which extend outwardly and support and carry the can testing pockets.

Each pocket comprises a fixed clamping member or disk 79 and a movable clamping member or disk 81. The fixed clamping member 79 carries a gasket forming the seat 53 for the open end of the can. It is mounted in the arm 78 upon hollow center stud 82 which extends through the arm 78 and through the clamping member 79, the parts being locked together by threaded collars or glands 83 and 84. The air is admitted to the can after clamping through a pipe 85 communicating with the bore 86 through the stud. The clamping member 81 is mounted to reciprocate toward the clamping member 79 to clamp and release the can as an incident to each testing operation.

A stub shaft 87 is secured in the arm 78 and is provided with a series of keys 88 extending out from its periphery. This stub shaft 87 is embraced by a sleeve 89 having keyways mating with the keys 88. A bracket 91 is adjustably secured upon the sleeve 89 to extend up from it and this bracket carries the movable clamping head 81. The bracket 91 is mounted upon the sleeve 89 and in a collar 92 formed integral with the bracket. The sleeve 89 is provided with a keyway 93, in which a wedge member 94 is arranged to extend up into the bracket. The wedge member 94 is adapted to be tightened and loosened in position by a bolt 95 extending through wedge rings 96 arranged on the opposite side of the bracket.

Adjustment of the can pocket to accommodate cans of different heights or lengths is effected by the movement of the bracket 91 towards and from the clamping member 79, the wedge connection between the bracket and the sleeve 89 locking the parts in adjusted position.

Two pairs of can receiving and centering arms, indicated respectively at 97 and 98 (Fig. 29), are provided for each can pocket. These arms are curved to the shape of the can body, and the cans fall upon them prior to the clamping action. The arms 97 are carried in side lugs 99 extending out from the sleeve 92, and the arms 98 are arranged through side lugs 101 extending out from the sleeve 89. It will be noted that movement of the clamping member 81 to bring the can in clamped relation is accompanied by movement of the arms 97 and 98, this organization moving as a unit to carry the open end of the can against the fixed clamping head 79.

The movable clamping member or head 81 and the arms 97 and 98 are brought into clamping position and are moved to release the can after testing by mechanism to be now described.

Referring to Fig. 1, reference character 111 indicates a cam member carried in a cross frame part 112, this cam member having a cam groove 113 extending generally arcuately about the center of movement of the can tester wheel. This cam groove is engaged by a roller 114 mounted upon a slide 115 associated with each can pocket.

Referring again to Figs. 27 and 29, it will be noted that the slide 115 is mounted in a bearing housing 116 to reciprocate radially of the wheel, this housing being secured across the rim 77 of the wheel. The slide 115 is pivotally connected to a link 117, in turn pivotally connected in downwardly extending lugs 118 on sleeve 89.

The rotation of the tester wheel is in the counter clockwise direction indicated by the arrow in Fig. 1. The parts of the cam 111 more remote from the center of the tester wheel are the parts holding the clamping members in clamped position, and the portion of the cam nearer the center of the wheel is the portion of the travel throughout which the clamping members are separated. In this part of the travel a can is released and discharged and a fresh one received from the chute 51.

After the cam roller 114 associated with a particular pocket has passed from the influence of the cam, the can is held in clamped position by a spring lock which consists of a ball 119 carried in a bore 121 in the slide housing 116 (Figs. 28, 29). A spring 122 presses the ball 119 against the slide and this ball engages in a recess presented to it when the parts are in clamped position.

*Delivery of air to the clamped cans*

Air under pressure is delivered to the filter box 57 (Fig. 1) from a delivery pipe 131. From here and after being filtered through screens (not shown), it is delivered through a conduit 132 to valve box 58 mounted in the frame member 112. From this valve box two pipes 133 and 134 lead to the distributor 59. The function of the valve box and its attendant mechanism is to insure against delivery of air to a can pocket in the absence of a can, and the mechanism for accomplishing this will be presently described.

The air after being received in the distributor is delivered to the interior of each can as it passes the air receiving station through the pipes 85 which establish communication between the pocket and the distributor itself. The distributor comprises a fixed air receiving member 135 to which the pipes 133 and 134 communicate and a rotating member 136 carried upon the hub of the tester wheel (Figs. 3 and 21). The pipes 85 communicate with internal bores and ports in the rotary distributor member or disk 136 and these bores periodically register with bores in the fixed distributor member or disk 135, with which pipes 133 and 134 communicate.

Referring now to the various figures on the sheet of drawing containing Fig. 20, it will be noted that the pipes 133 and 134, which lead from the valve box 58 to a distributor, are connected in communication with two bores 137 and 138 in the stationary disk member 135, being secured in registration with these bores by stuffing boxes 139. The two bores 137 and 138 are of different lengths and each communicates with an elongated outlet 141 in the face of the disk adjacent the rotary member 136. It may be mentioned at this point that the purpose of providing the two pipes 133, 134 and the two outlets 141 is to permit the overlapping delivery of air to successive cans, thus permitting a greater number of can pockets to be arranged around the periphery of the tester wheel. The pipes 85 communicate with radial bores 142 extending into the rotary member 136. The bores 142 have outlets 143 arranged to register with the outlets 141 of the pipes 133 and 134, alternate bores 142 registering with outlets 141 of bore 137, and alternate bores 142 having outlets 143 registering with bore 138. The elongated outlets 141 extend in the overlapping relation shown in dotted lines so that at times two connections are receiving air simultaneously. The arrangement of these bores is perhaps best shown in section in Fig. 22. The air under pressure is admitted to the cans throughout the arc of their travel represented by the elongation of the outlets 141 and immediately outlet 141 passes out of registration with its companion outlet 143 the can is sealed against escape of air or diminution of pressure except by leakage until the test is complete, this sealing occurring throughout the greater part of the travel of the tester wheel. The sealing of the cans is illustrated in Fig. 23, which is a section taken on the line 23 of Fig. 20.

The rotation of the tester wheel carries the can in this sealed condition from the station located generally at section line 22 around to the section line 24, at which station the air in the can is placed in communication with a detector mechanism to be presently described, which measures the pressure in the can and governs the sorting mechanism.

The gauge pressure within each can is preferably taken at a point in its testing travel and this is accomplished by a gauge 144 communicating with a bore 145 in the member 135, this bore 145 having an outlet adapted to register with a delivery outlet 146 communicating with each of the bores 142, this gauge serving to indicate to the operator that air under proper pressure has been delivered to the cans in the pockets, and thus providing a check upon the entire delivery system.

At the station indicated by section line 24, the testing of the can is complete and the outlet of its pocket 146 comes into communication with a bore 147 communicating with an outlet pipe 148 leading to the detector.

The mechanical construction and mounting of the parts of the distributor will now be described, reference being had to Fig. 3. The movable member 136 is of disk or annular form, being perforated at its center to fit over and embrace the hub 149 of the tester wheel, and it is secured to hub flange 151 by stud bolts 152 for continuous rotation with the tester wheel. The stationary member 135 is mounted for a slight rubbing movement against the ported face of the rotating member and is carried upon a flange 153 of a sleeve 154 extending through the bearing at the top of the right-hand support 72, which sleeve extends about the shaft 74. At one point the sleeve is provided with a slot 155 in which is mounted the head 156 of a pin 157 taking into a recess in member 135. The end of the shaft 74 is reduced at 158 and is embraced by a sleeve 159 secured to the end of the hub of the tester wheel. This sleeve 159 is provided with a pinion or gear 161 near its outer end, which gear pinion meshes with a companion gear or pinion 162 upon a shaft 163 arranged in a bearing 160 in the said support 72 and having an eccentric pin 164 also taking into a recess in the member 135. The sleeve 159 rotates with the tester wheel and provides a slight circular movement to the pin 164, which minutely moves the member 135 to cause the contacting faces of the members 135 and 136 to rub upon each other, polishing the same and preventing localized wearing.

Springs 165 are interposed between the flange 153 and the member 135 to hold the members 135 and 136 in pressure contact. Two screws 165' (Figs. 1 and 21) are extended from the support 72 and are adjustable to force against the flange 153 in order to vary the tension on springs 165 and properly position the member 135 relative to member 136.

*Detector mechanism*

As has already been stated, the result of the testing of each individual can is determined by a detector mechanism, which as a result of such test governs the sorting of the perfect from the imperfect cans. This detector mechanism is shown in detail in Figs. 13 to 15. It comprises, generally speaking, a diaphragm having a predetermined pressure upon one side and functioning by variation in the pressure on the other, this last mentioned pressure being that communicated to it from each can at the end of the testing movement. The detector functions to complete a controlling electric circuit upon failure of the pressure, which causes the subject can to be directed from the normal can delivery. The detector comprises a casing or housing formed of a base member 171, a body or central member 172, and a cover or top member 173. Supporting feet 174 extend down from the bottom member and are secured upon the frame cross-member 112 already mentioned. The detector diaphragm, indicated by reference character 175, is mounted between the top member 173 and central member 172, being clamped at its edges between these parts. The diaphragm in the present instance is of flexible sheet metal corrugated intermediate its confined edge 176 to increase its flexibility and insure its permanent accurate operation.

The chamber forming faces of the center and top members of the detector housing are preferably corrugated substantially in accordance with the corrugations on the diaphragm and dimensioned to provide spaces above and below the diaphragm of relatively small capacity so as not to use much air in a test or decrease the pressure of air within a can otherwise than by leakage. Air under predetermined pressure is admitted to a relatively large chamber 177 beneath a cross partition 178 forming the lower wall of the space beneath the diaphragm through a delivery pipe 179, which pressure, as will be presently explained, is different from but predetermined in respect to the pressure employed for the air in testing the cans. The chamber 177 communicates with the diaphragm chamber through ports 181 and these ports preferably lead into one or more radial channels 182 in the upper face of partition 178. The space above the diaphragm is in communication with pipe 148 leading from port 147, (Fig. 24) which is placed in communication with the interior of the can at the end of the testing period, as has already been described. A port 183 in the top member 173 of the detector housing communicates with a channel 184 similar to the channel 182 already described.

Two electric terminals, indicated respectively at 185 and 186 (Fig. 15) are adapted to be brought in contact when the pressure in a particular can has dropped in the testing, these terminals completing an electric circuit accomplishing the sorting. Terminal 185 is fixed and terminal 186 moves with the diaphragm as the pressure varies. Terminal 185 is mounted upon the end of an adjustable rod 187 carried in a sleeve 188 in turn threaded within a supporting bushing 188'. The terminal, sleeve and bushing are in registration with an opening 189 through the top member 173 of the detector housing, and the bushing 188' rests upon a glass sight collar 191 in turn mounted upon and surrounding the opening 189. Bolts 192 hold these parts in rigid assembled relation and their contacting surfaces or edges are sealed with suitable packing. The terminal 185 is mounted in a plug 193 behind which is mounted a spring 194, enabling yielding of the fixed terminal upon contact with the movable one.

The movable terminal is carried by the diaphragm, being mounted in the end of a post 195 extending through the diaphragm and held in upright position thereon by the clamping of the diaphragm between shoulder 196 on the post and a nut 197 therebeneath. A spring 201 is arranged between the lower end of sleeve 188 and a shouldered collar 202 embracing the post 195 and bearing against the shoulder 196 above the diaphragm. This spring cooperates with the pressure above the diaphragm to hold the terminals apart. The sleeve 188 may be raised or lowered to adjust the tension of the spring and produce the desired balance against the pressure provided in the chamber 177 already described, and the rod 187 may be adjusted in vertical position and clamped to provide the desired space between the terminals when in normal position. The terminals 185 and 186 form a part of an electrical control circuit which will be later described as a unit.

When a non-leaky can is being tested the air pressure will be substantially the same on both sides of the diaphragm. The spring 201 increases a little the pressure on the top of the diaphragm, and under these three pressures the diaphragm will assume a certain position, and the sleeve will be adjusted so that under these conditions there will be a circuit-interrupting space between the terminals 185, 186.

*Restoration of detector to normal position after each can test*

Means are preferably provided for supplying air under pressure above the diaphragm after each can is tested, this being to insure the maintenance of a normal condition in the detector at the time the pressure influence of each can is received. This means will now be described, reference being had particularly to Figs. 3, 20, 25 and 26.

A channel 211 is provided in the face of the rotatable member 136 and into this a ring 212 is inserted, which ring bears against hub flange 151 of the tester wheel. An annular channel 213 is arranged back of the ring 212 to extend uninterruptedly around the face of the member 136. The ports 214 extend through the member 136 between the bores 142 and normally are closed by engagement with the presented face of the stationary member 135. A pipe 215 leads from the valve box 58 to a bore 216 in the member 135 and communicates with an arcuately elongated outlet 217 in the member 135 radially arranged for communication with the ports 214 as in the course of their rotation they arrive opposite the bore 216. The construction of this is shown at the station indicated by section line 26 in Fig. 20 and an example of the communication there established is disclosed in Fig. 26.

The pipe 215 is in constant communication with the source of air pressure for the can testing and successive presentation of the ports 214 maintains such pressure in the annular channel or chamber 213. Viewing Fig. 20, it will be noted that a pipe 218 at the station, indicated by section line 25, communicates with a bore 219 also adapted to register with the ports 214 for the annular pressure chamber 213. The pipe 218 communicates directly with the space above the diaphragm and the bore 219 is so located that almost immediately after the diaphragm has been affected by communication between the interior of the can and the detector at the station of section line 24 air under full pressure is supplied to the detector to restore conditions prior to the detection of the pressure in the next succeeding can.

The action upon the detector then when a leaky can is presented at the station 24 is as follows: Such a can being presented at the station of section line 24, communication is established (Fig. 24) through pipe 85, bore 142, bore 146, bore 147, pipe 148 to the upper side of diaphragm. The pressure in chamber 177 lifts the diaphragm to bring electric terminals 185 and 186 into contact, and mechanism is set to discharge the leaky can from the normal can run. Immediately thereafter the detector is rearranged to disconnect the terminals 185 and 186 and bring the parts to the arrangement shown in Fig. 15. This is accomplished through an air line from annular chamber 213 as follows: Port 214, port 219, pipe 218 to above the diaphragm 175.

No-can-no-air-feature

As has already been stated, means are provided for preventing delivery of air under pressure and the venting of the system should a pocket be presented without containing a can for testing. Viewing Fig. 1, it will be noted that when the cans are received from the chute 51 they are held in the pockets by a shoe 221 pivoted at 222 above the end of the chute and pressed by a spring 223 against the can seat arms of the pocket. Immediately above this and just before the can reaches the can testing station, the arm 224 is arranged to extend across the path of travel of the can itself and to be pressed in a clockwise direction, viewing Fig. 1, by the can in the pocket. When the arm 224 is thus pressed upwardly, valves in the valve box 58 permit delivery of air to the pipes 133 and 134 and the absence of a can operates to close these valves so that air is not delivered to the appropriate pipes. The construction and operation of the parts accomplishing this is shown in Figs. 16 to 19. Air under the desired pressure is freely admitted into valve box 58 and from it is freely delivered to the pipe 215 and by this pipe to the annular pressure chamber 213. Air for the pipes 133 and 134 however, which it will be remembered supply the pressure within the cans themselves, is delivered through an oscillatory valve 225 mounted upon a rock shaft 226 in a valve housing 227 arranged over a port 228 in the side of the valve box.

The oscillatory valve 225 is provided with two ports 229 which are adapted to be brought into and out of registration with ducts 231 communicating with the pipes 133 and 134 respectively. The valve 225 is operated from and in conjunction with the movement of the arm 224, which has been described as extending across the path of the travel of the cans in the pockets. The arm 224 is secured to a collar 232 fast upon a rock shaft 233 carried in the top of a bracket 234 which extends up alongside the delivery chute and which also supports the shoe 221. A second arm 235 on rock shaft 233 extends downwardly and carries a perforated block 236 at its lower end. A rod 237 extends through the block 236 and is connected at 238 to an arm 239 on rock shaft 226. The end of the rod 237, which extends through and beyond the block 236, is provided with a stop 241 and a collar 243 is secured upon the rod 237 to confine a spring 242 embracing the rod 237 between itself and the arm 235, this spring tending to press the rod to the left (viewing Fig. 16), and hold the arm 235 in engagement with the stop 241. A spring 244 is secured to the stop 243 and to a lug 245 extending up in continuation of the arm 235 beyond shaft 233. This last mentioned spring 244 tends to press the can engaging arm 224 across the path of travel of the cans, moving the organization of valve controlling parts to closed position when no can is presented to restrain the movement. Closing of the valve precludes delivery of air under pressure to the empty can pocket, and in restraining such delivery prevents venting of the system, as will be readily appreciated.

The closing of the valve at the valve box 58 cuts off the supply of air under pressure simultaneously to the pipes 133 and 134 and these pipes are sealed while the can pocket is passing throughout the arc represented by an elongated port 141, already mentioned. This, however, does not interrupt supply of air to the can pocket immediately in advance or immediately behind the one producing the interruption of the delivery, since the pipe 85 of the one ahead or the one behind is in communication with the companion port 141 either before or after such interruption of air supply. See in this connection Fig. 20.

Can delivery mechanism

As has already been stated, the cans after being tested are delivered into one or the other of two chutes 54 and 55, the chute 54 receiving the perfect cans and the chute 55 the leaky ones. The clamps release the cans when the pockets arrive opposite a guide plate 251 pivoted at 252 (Fig. 1) on a bracket 253 carried by the frame of the tester and arranged beneath and adjacent the chutes 54 and 55.

An arm 254 is mounted rigid with the plate 251 and is connected to a spring 255 which tends to pull the plate into can engaging position, cooperating stops 256 being provided on the arm 254 and bracket 253 to limit the movement of the plate into the can pocket.

The gate 56 is secured upon and to a cross-shaft 257 and when in the position shown in Fig. 1 forms a continuation of plate 258, forming the bottom of the upper chute 54. The gate 56 is adapted to be raised when a leaky can is detected to deliver it into the lower chute 55 for separate disposal. Mechanism is provided for automatically shifting this gate from the one position to the other and to maintain it in its shifted position until the condition of the cans delivered require its movement; that is to say, a succession of leaky cans or a succession of perfect cans, is delivered without the movement of the gate 56.

The gate 56 is normally moved toward the position shown in Fig. 1 from that shown in Fig.

2 by a spring 261 secured to the frame at 262 and to an arm 263 fixed on shaft 257. This spring holds the gate in position to deliver cans to chute 54 unless the gate is positively moved to and held in position to deliver cans to chute 55.

Referring now more particularly to Figs. 30 to 34, it will be noted that an arm 264 is mounted upon shaft 257. This arm is loose upon this shaft and is rocked or oscillated by a link 265 in timed relation to the movement of the tester wheel, a complete back and forth oscillation occurring as an incident to the arrival of each can pocket at the delivery chutes. Upon the presentation of a leaky can for delivery from the tester, the arm 264 is operatively connected with the shaft 257 to rock the same from the position shown in Fig. 31 to that shown in Fig. 33, lifting the gate to direct the leaky can into the lower chute. This operative connection is established by mechanism controlled through an electromagnet 265' which is normally energized by an electric circuit in turn controlled by the detector 61, as will be presently described in connection with the electric wiring of the apparatus.

It perhaps should be stated at this point in the description of the apparatus shown on the drawings that the various controls maintain this magnet in energized condition except when leaky cans are presented, the air supply fails or some unintended interruption of the electric current happens.

A yoke 266 is fixed upon the shaft 257 and straddles arm 264. A short shaft 267 is arranged through bearings in this yoke and a pawl 268 is fixed to this short shaft between the arms of the yoke and depends down into position to be engaged with a tooth 269 at the top of the arm 264. The pawl is urged toward tooth engaging position by spring 271 connected respectively to the pawl and to the yoke. While the cans delivered are perfect, the pawl is maintained out of tooth engaging position by the magnet. An arm 272 is loosely mounted on shaft 267 and is connected at its lower end, as will be presently described, to a magnet link 273 in turn connected to the armature 274 of the magnet. A collar 275 is fixed upon shaft 267 and is provided with a lug 276 arranged to extend over in front of a lug 277 forming a continuation of arm 272. A set screw 278' being provided to adjustably arrange the relationship between lugs 276 and 277.

The arm 272 extends down to arrange its end at or substantially at the center of the shaft 257 so that this end of the arm is without any considerable movement when the yoke 266 is oscillated with the arm 264. The connection between the arm 272 and the magnet link 273 comprises a pin 278 arranged through a slot 279 in the end of the magnet link. A pressure slide 281 is mounted within an internal bore 282 in the magnet link, being pressed against the pin 278 by a spring 283 in this bore and confined by a plug 284 closing the end of the bore adjacent the magnet. The magnet link is connected to the armature 285 of the magnet by a pivot pin 286. The parts are shown in Fig. 31 in the arrangement they assume when the magnet is deenergized, its armature being moved toward the right by a spring 287 in the usual manner.

With the parts in the position just described, oscillation of the arm 264 toward the left, viewing this figure, will cause engagement of the pawl 268 with the tooth 269 and cause it to be moved with a resulting shifting of the gate into the position shown in Fig. 33. The pin and slot engagement between the arm 272 and magnet link permit free movement of the parts notwithstanding the change of relationship.

A latch 291 is pivoted at 292 on a bracket member 293 supported on the frame of the apparatus and is adapted to engage over the yoke 267 as the arm 264 moves to the right (viewing the figure), should the next succeeding can also leak. The condition of the can is determined while the arm 264 is moving toward the left (viewing the figure. A head on the magnet link 273 provides a shoulder 294 upon which rests normally a lug 295 fixed upon a vertical link 296 pivoted at its upper end at 297 to the latch, and at its lower end at 298 to a short lever 299 in turn pivoted at 301 in bracket 293. When the magnet is deenergized and the armature moved to the position shown in Fig. 31, the latch and connected parts move down into yoke engaging position, the lug 295 arranging itself in position to engage the shoulder 294 to prevent movement of the armature as an incident to the reestablishment of the pressure above the diaphragm of the detector and between presentation of successive cans.

Lever 299 is provided with a toothed end 302 adapted for engagement with a shoulder 303 upon arm 264. These parts are so arranged that when the arm 264 reaches the position shown in Fig. 33, the lug 295 is lifted above the shoulder 294 and through the link 296, and the latch moves out of yoke engaging position. If at this time a can which does not leak is presented, the magnet is energized and the armature moved to the left, arranging the head of the magnet link beneath the lug 295 and holding the latch out of operative position.

If, however, the next succeeding can leaks, the magnet is deenergized at the moment so that upon movement of the arm 264 toward the left (viewing the figure), the lug 295 and latch 291 lower respectively into position to engage shoulder 294 and yoke 266, holding the gate 56 in elevated position.

*Failure of air supply*

Should there be a failure of air supply to the apparatus from any cause, all of the cans will be delivered to the lower chute 55 and none directed in the ordinary course to the chute 54.

Referring to Fig. 1, it will be noted that a pipe connection 311 is provided between the filter box 57 and a contact box 312, the details of this contact box being disclosed in Fig. 11.

A fixed contact 313 is mounted within the box in a holder 314. A flexible contact 315 is supported from this holder at 316 and is insulated therefrom at 317. A tube 319 is arranged beneath the contact box 312 and forms the connection between pipe 311 and this box. A plunger 318 mounted in tube 319 engaged beneath the contacts normally presses contacts 313 and 315 into engagement. Upon failure of air supply, the contact 315 lowers by its own spring action and interruption of the energizing circuit for the magnets is accomplished. Upon such interruption, as will be readily understood, the gate 56 is maintained in the elevated position shown in Fig. 2.

*Electric wiring*

The electric wiring is diagrammatically shown in Fig. 12 and comprises a circuit which normally energizes the magnet as follows: A wire 321 leads from the positive side of a source of power (the negative being grounded at 322) to contact 313. A wire 323 from companion contact 315 leads to one side of a lamp 324. From the other side of this lamp, a wire 325 leads to the magnet core 326 which in turn is grounded at 327. Movable contact 186 in the detector is grounded at 328. Fixed contact 185 is connected by wire 329 with wire 325, so that when contacts 185 and 186 are engaged (by the detection of a leaky can), the magnet is short-circuited, current then flowing through wire 321, contacts 313 and 315, wire 323, lamp 324, wire 329, contacts 185 and 186, and ground connections 328 and 322. Should the electric current be cut off, no current flows through the system, and the same result is attained upon failure of air pressure by the opening of the circuit between contacts 313 and 315, in either of which events the magnet is, of course, deenergized and no cans can be delivered as perfect unless they have been tested and found so.

Power mechanism

All of the operating parts of the apparatus receive their power from a main power shaft 331 mounted in bearings 332 at the lefthand end of the apparatus (viewing Fig. 4). This shaft extends clear across the frame of the apparatus and is provided at one end with a bevel pinion 333 (Fig. 8) in turn engaging a bevel pinion 334 upon a shaft 335 mounted in a bearing bracket 336 extending up from the base of the frame. Power is supplied to the shaft 334 through a pulley or other driving mechanism 337.

Two clutches 338 are mounted upon shaft 331 and each controls delivery of power to a tester wheel and its associated mechanisms. These clutches are alike in construction and a description of one of them will satisfy for both. In the present instance, the clutches are of the disk type, having driving disks 339 and 341 and driven disk 342. The driven disk is mounted in a clutch member 343, loose on shaft 331, this disk being arranged between the two driving disks 339 and 341 in position to be clamped therebetween for driving engagement. This engagement is accomplished by movement of a clutch collar 344 link connected at 345 to the disks.

Provision is made to operate either clutch from either side of the apparatus and in the present instance from the end of the apparatus into which the cans are received and delivered.

Referring to Fig. 10, reference character 347 indicates the clutch shifting yokes. These are formed upon the ends of yoke carrying levers 348 pivoted at 349 to the bracket 349' which is bolted on the base and passing down through its top. The yoke levers 348 are pivoted at 351 to rods 352' extending toward the sides of the apparatus from the yokes and in turn connected to bellcranks 352 pivoted at 353 in the base. The bellcranks are thus arranged on opposite sides of the apparatus and extend out from the base into pivotal engagement with rods 354 arranged alongside the apparatus and extending to the delivery and receiving end of the apparatus.

Referring now to Figs. 1 and 5, it will be noted that the two rods 354 are respectively connected to vertical arms 355 mounted for pivotal movement as will now be described about the center of a shaft 356 (Fig. 5). The shaft 356 extends across the apparatus and is arranged within a sleeve 367, which sleeve has bearings at 368 in brackets 369 extending up from the base. At each end the shaft extends beyond the sleeve and control levers are provided at each side to move each clutch. These levers are indicated respectively by reference characters 371, 372, 373 and 374. The levers are so connected with the arms 355 that the lefthand lever at each side (viewing an end of the apparatus) operates the clutch for the mechanism of the lefthand tester wheel, and the righthand lever at each side, the righthand tester wheel.

The operation of the arm 355 at the right of the apparatus (viewing Fig. 5) will first be considered. The lever 374 and the arm 355 are formed integral with a collar 375, which is locked to shaft 356 by set screw 376. The lever 372 at the opposite side of the apparatus is formed integral with a collar 377, also locked to shaft 356 by a set screw 378. Manipulation of either of the levers 372 or 374 will, therefore, operate the righthand clutch.

The arm 355 at the lefthand side to this figure, is formed integral with lever 371 having a boss 379 loose on shaft 356 and an integral arm and collar 381 embracing sleeve 367 and locked thereto by set screw 382. Lever 373 is formed integral with a collar 382 also embracing sleeve 367 and fastened thereto by set screw 383. It will be manifest that the manipulation of either of the levers 371 or 373 will actuate the lefthand clutch.

Power is delivered to the tester wheel in the first instance upon engagement of a clutch by gearing which will now be described, it being understood that this gearing is duplicated for each tester wheel organization.

Reference being had to Fig. 8, it will be noted that a pinion 391 is formed integrally with a sleeve 393 which is keyed to the hub of clutch driven member 343. The pinion 391 engages a gear 394 fixed upon a shaft 395 arranged in bearings provided in brackets 396 and 397 upon the base. The two shafts of the two tester wheel mechanisms are in registration with each other and each extends substantially half way across the apparatus. Each of these shafts carries a pinion 398 in mesh with a large idler gear 399 loose upon a shaft 401 having bearing in brackets 397. The idler gears 399 mesh with and drive rim gears 402 mounted upon the tester wheels themselves (see Fig. 3).

The arms 264 are cam driven from cams 411 fixed to and rotatable with pinions 391. Each cam is provided with a cam groove 412 (Figs. 6 and 7) within which rides a cam roller 413 mounted upon a lever 414 pivoted at 415 in bracket 396. The lever 414 is connected at 416 to link 265, already described, as connected to oscillating arm 264 for actuating the gate between the chutes 54 and 55.

If desired, each shaft 395 may be provided with a hand wheel 417 for manually moving the parts of each tester wheel organization when the clutch is disengaged for adjustment, repair and inspection.

Automatic brake construction

Brake mechanism is provided to cause immediate stopping of the parts upon disengagement of the clutches. This brake mechanism is so constructed and arranged that it may be disengaged while the clutches are thrown out to permit the manual operation of the machine already mentioned. The braking elements proper comprise brake shoes or halves pivotally supported in bracket 396 at each side of the apparatus at 421 above the shaft 395. A brake drum 422 is provided upon this shaft and is shown as arranged alongside and within the gear 394. Each brake member comprises two arcuate parts 423 suitably lined with brake material. Beneath the shaft 395 the brake members are extended to provide perforated lugs 424 through which a rod or bolt 425 is arranged. Head 426 on this rod or bolt bears against one of the lugs 424 and a spring 427 embraces the rod or bolt beyond the other lug to press the lugs together and into braking relation with the drum. A short shaft 428 has bearing in bracket 396 and extends between the lugs.

The shaft is provided with a flat narrow head 429 which extends between the lugs loosely embracing the rod or bolt 425, the turning of the shaft, as will be readily apparent, causing separation of the lugs against the force of the spring 427 to release the brake after it has once been set. Fig. 35 discloses the parts in braking position, and Figs. 36 and 37 in release.

An arm 431 is pinned to the outer end of each shaft 428 and is pivotally connected to a lever 432 by pivot pin 430 in turn pivotally connected at 433 to a link 434, and this link is pivotally connected at 435 to a pivoted arm 436 carried in the frame at 437. A rod or link 438 (Fig. 4) is loosely connected to pivot 435 and is pivoted also to a collar 439 on one of the clutch operating rods 354. The lever 432 and link 434 form a toggle connection, the toggle being open or broken when clutch rod 354 is moved to clutch releasing position, this arrangement being shown in Fig. 35. When, however, the clutch operating rod is moved to the left (viewing Figure 4), it carries pivot 435 in the same direction, swinging the link 436 about its pivot 437. This link 436 is provided with a stop or lug 441 which engages a companion stop or lug 442 on the lower end of link 434. After this engagement, links 434 and 436 move together and until pivot pin 433 comes in contact with a bracket 434'. The movement of these links to the brackets swings the arm 431 up from the horizontal plane and moves the head 429 to brake releasing position.

The brake may also be moved to release position while the clutch rod 354 remains in clutch release position. This is accomplished by movement of lever 432 to swing the parts from the position shown in Fig. 35 to that shown in Fig. 36. This movement causes swinging of the link 434 about the pivot 435 and a swinging also, of course, of the lever 432. In this movement, the link 434 and the lever 432 causes the pivotal connection 433 between them to pass the line, including the centers of the pivots 430 and 435, arranging the parts in pressure toggle relation, somewhat further compression of the spring 427 being necessary before the pivot point 433 can move back across the line just mentioned to released position.

Conclusion

It is not believed that a detailed description of the operation of the apparatus will be needed, since the function and action of the several parts have been described under the several headings.

It is thought that the invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. In a can tester of the type embodying a frame and a plurality of tester wheels mounted on said frame, each tester wheel comprising means confining air under pressure in successive cans introduced into said tester, a detector for determining the leakage of pressure from said cans, a separating mechanism for separating leaking from non-leaking cans as determined by said detector, an electric control for said separating mechanism, and means rendering said electric control inactive between introductions of successive cans under predetermined conditions of tightness or leakiness in said cans.

2. In a can tester, the combination of a conveyor, a can clamp carried by said conveyor and adapted to hold a can in testing position, means supplying air under pressure to a can held in said clamp, a gate for separating leaky from non-leaky cans, an electric control for said gate and automatically operable by pressure conditions within the can as a result of the test, and connection from said control to the gate to operate the gate, and means rendering said electric control inoperable upon diminution of pressure supplied to the can beneath a predetermined amount.

3. In a can tester, the combination of means confining air under pressure in successive cans introduced into said tester, a detector for determining the leakage of pressure from said cans, a separating mechanism for separating leaking from non-leaking cans as determined by said detector, an electric control for said separating mechanism, and means rendering said electric control inactive between introductions of successive cans under predetermined conditions of tightness or leakiness in said cans.

4. In a can tester, the combination of means confining air under pressure in successive cans introduced into said tester, a detector for determining the leakage of pressure from said cans, said detector comprising a diaphragm exposed at one side to air under pressure and at the other side to air under pressure which communicates with the interior of a can, and an electric contact on said diaphragm, and a spring cooperating with said last mentioned air pressure to normally hold said electric contact out of circuit closing position, a separating mechanism for separating leaking from non-leaking cans as determined by said detector, an electric control for said separating mechanism, and a continuously moving means normally disconnected from said separator and automatically connectible thereto under predetermined conditions of tightness or leakiness in said cans, for actuating said separating mechanism.

5. In a can tester, the combination of means for subjecting a succession of cans introduced into said tester to a testing medium, a detector for determining a change in pressure from the normal pressure within a can of said testing medium, a separating mechanism for separating leaking from non-leaking cans as determined by said detector, an electric control for said separating mechanism and means rendering said electric control inactive between presentation of successive cans under predetermined conditions of tightness or leakiness in said cans.

6. In a can tester, the combination of a plurality of conjointly movable can testing pockets adapted to confine air under pressure in cans to be tested in said pockets, an air distributor comprising a fixed member and a member movable thereagainst, a plurality of air ports in said fixed member adapted to register with corresponding ports in said movable member in overlapping time relationship to permit overlapping delivery of air to successive cans.

7. In a can tester, the combination of a tester wheel, can holding pockets mounted on the periphery of said wheel, air means connecting with said pockets for testing cans therein for leaks, a substantially fixed distributor member arranged about the axis of said wheel and held against rotation, a movable distributor member also arranged about the axis of said wheel and rotating therewith and held in face to face air-tight engagement with said fixed distributor member, means in said distributor members for controlling said air distributor means, and means for laterally shifting said movable distributor member relative to said substantially fixed distributor member during rotation of the former about said wheel axis to prevent uneven wearing of the engaged faces of said members.

8. In a can tester, the combination of a tester wheel, can holding pockets mounted on said wheel, a fixed distributor member arranged about the axis of said wheel, a movable distributor member also arranged about the axis of said wheel and rotating therewith and held in face to face air-tight engagement with said fixed distributor member, an air duct leading from each can testing pocket to said movable distributor member, ports formed in said movable member and connecting with said ducts, the ports of adjacent ducts being located at different distances from the center of said wheel to permit their closer arrangement in said movable distributor member, means in said fixed distributor member for selectively passing air through said ports to effect the testing of said cans, a separating mechanism for separating leaky from perfect cans, and means supplying air to said distributor member including means for causing said separating mechanism to deliver all cans as leaks upon failure of the air supply.

9. In a can tester, the combination of means confining air under pressure in successive cans introduced into said tester, a detector for determining the leakage of pressure from said cans, said detector comprising a diaphragm exposed at one side to air under pressure and at the other side to air under pressure which communicates with the interior of a can, a separating mechanism for separating leaking from non-leaking cans as determined by said detector, an electric control for said separating mechanism, a continuously moving means normally disconnected from said separator and automatically connectible thereto under predetermined conditions of tightness or leakiness in said cans as effected by said electric control for actuating said separating mechanism, and means for synchronizing the connection of said separator and said moving means with a said can under test.

MAGNUS E. WIDELL.